INVENTOR.
Walter L. Rye.
BY
Wood, Herron & Evans
ATTORNEYS.

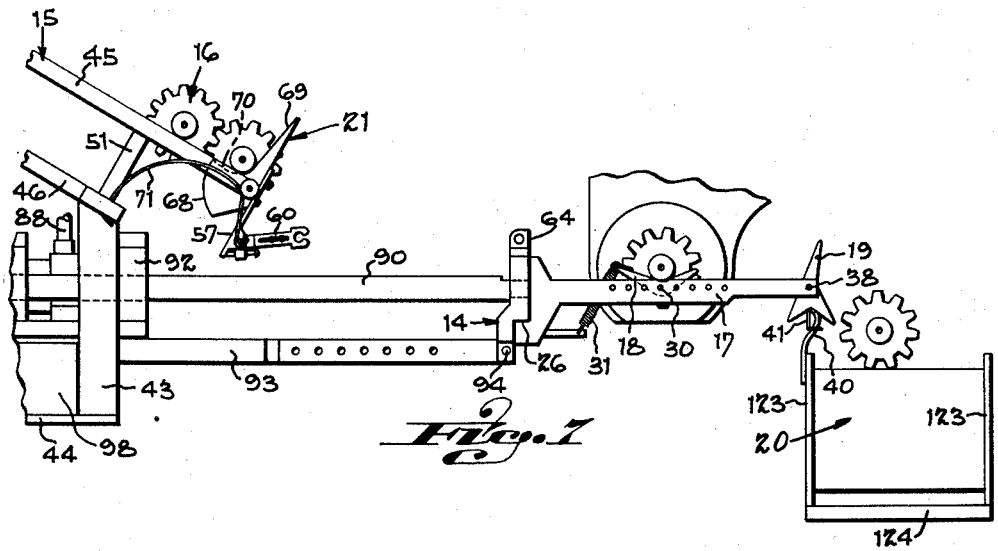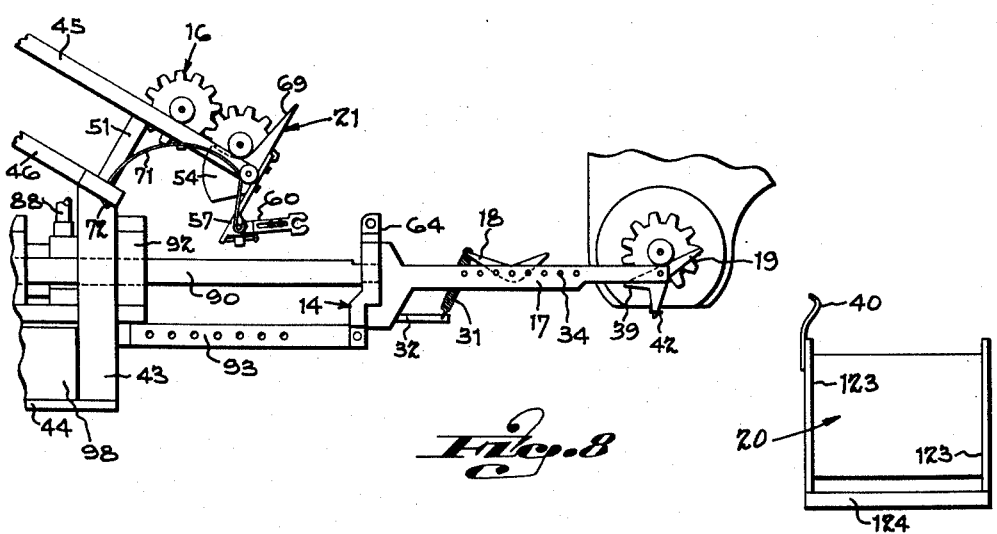

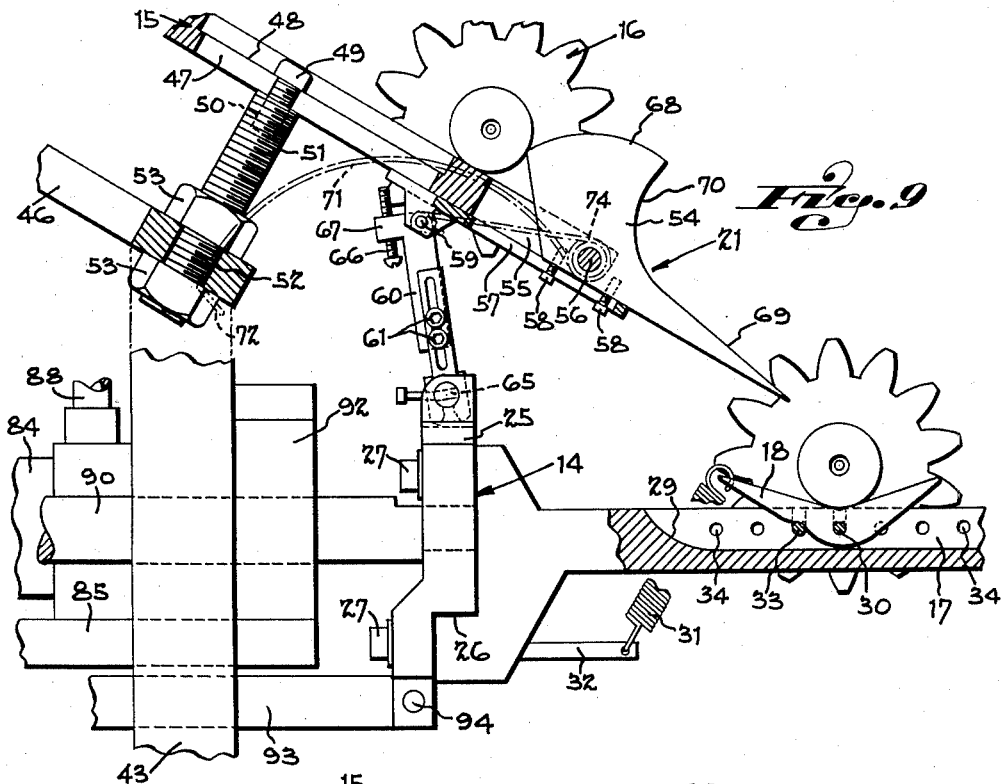
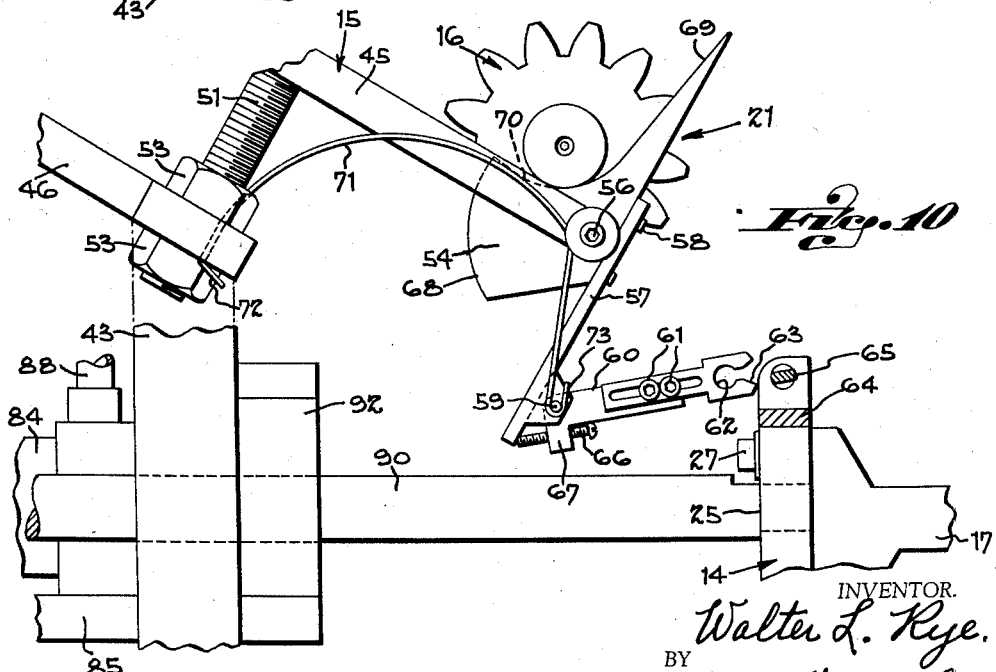

Nov. 3, 1959    W. L. RYE    2,910,919
WORKPIECE LOADING AND UNLOADING MECHANISM
Filed Jan. 15, 1957    10 Sheets-Sheet 8
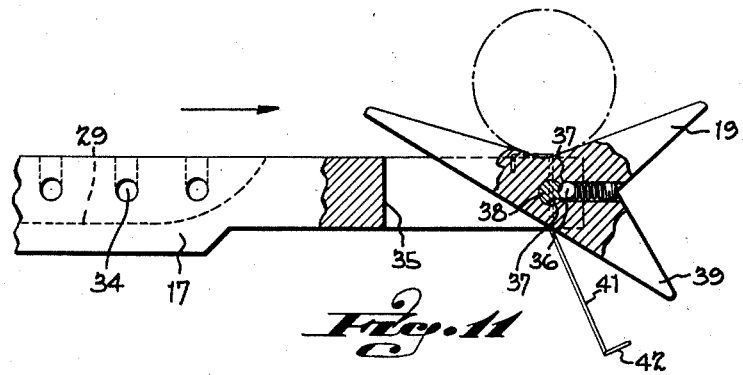
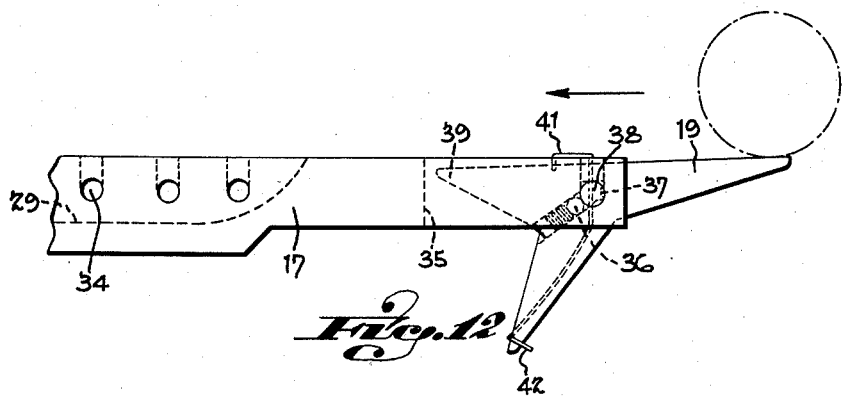
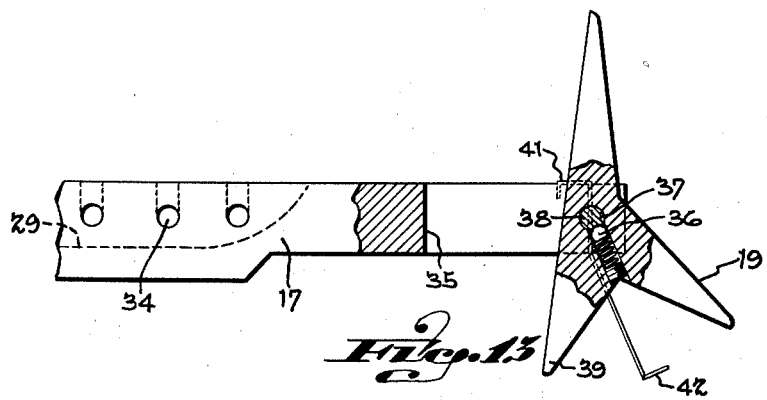

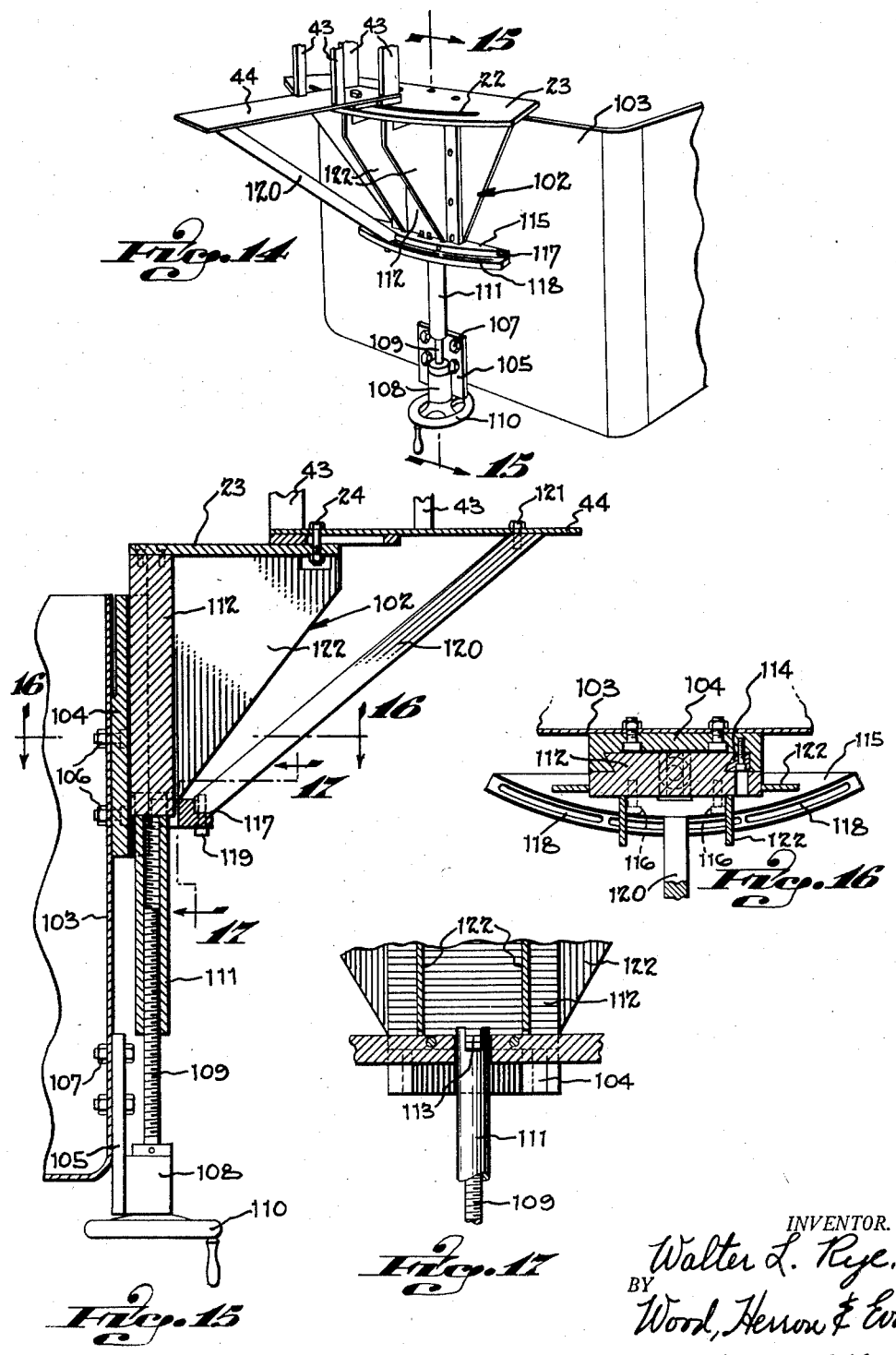

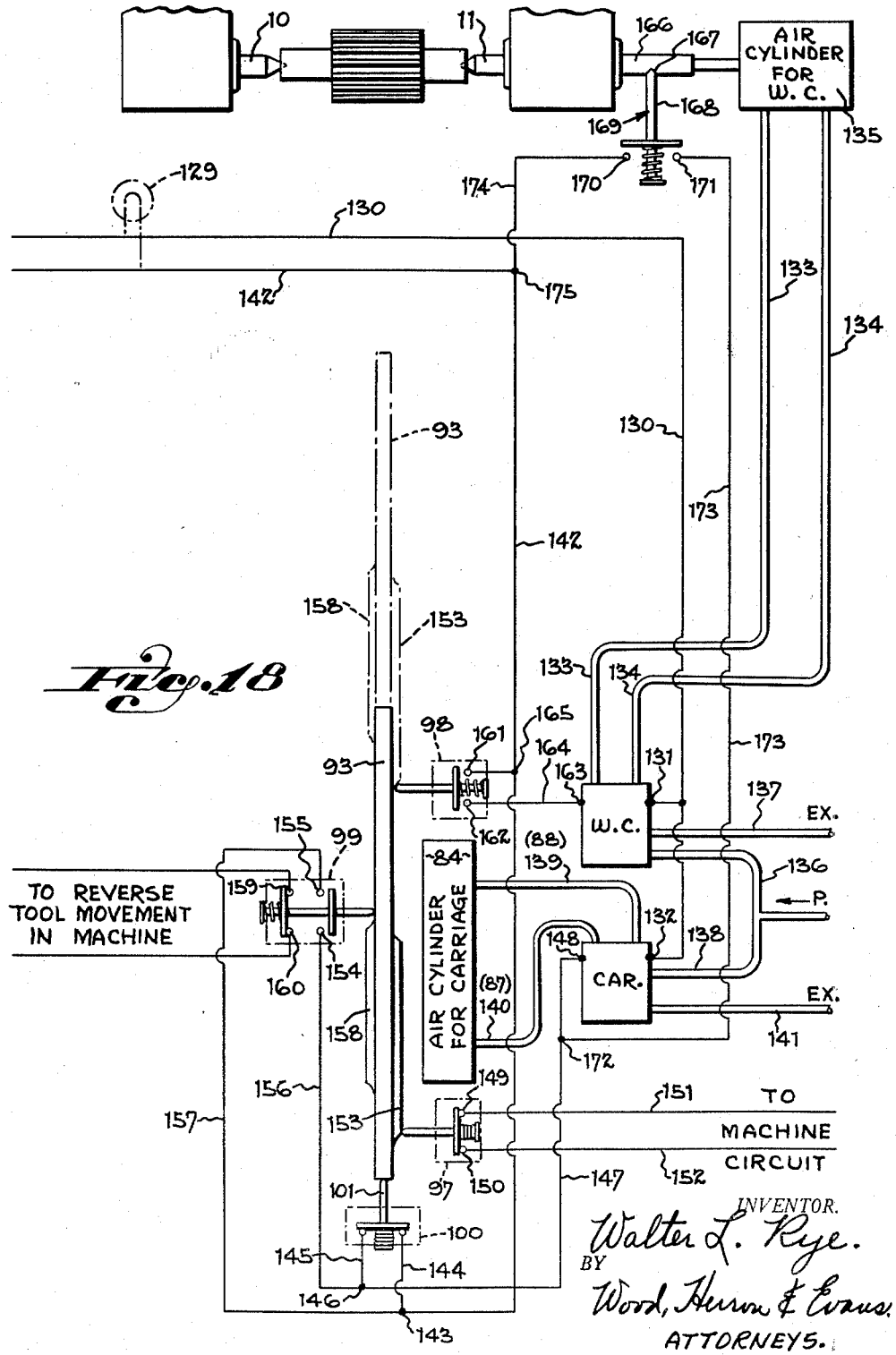

United States Patent Office 2,910,919
Patented Nov. 3, 1959

2,910,919

WORKPIECE LOADING AND UNLOADING MECHANISM

Walter L. Rye, Cincinnati, Ohio, assignor to The Cincinnati Gear Company, Cincinnati, Ohio, a corporation of Ohio Application January 15, 1957, Serial No. 634,263

6 Claims. (Cl. 90—1)

This invention relates to machine tools and it is directed in particular to a loading and unloading mechanism which is adapted to be used in conjunction with machine tools of the general type which are designed to complete automatically an operation upon a workpiece after it has been placed in the machine. The invention has its greatest utility where a large number of identical parts are to be run on a machine. That is, the machine is set up to perform a specific operation and it requires only the automatic delivery and removal of the workpieces to make the complete operation fully automatic. An automatic gear shaving machine is an example of a machine tool of this type, and for the purposes of this disclosure the mechanism is explained in relation to such a machine. It is believed that the adaptation of the mechanism to other machine tools will be obvious to those skilled in the art from the explanation.

It has been the practice in the operation of gear shaving machines in the past to have an operator load and unload the workpieces by hand. To do this the operator selects an unfinished gear and places it in the machine where it is gripped between work centers. When the gear is in place, the machine is started and it goes through its complete work cycle automatically, stopping when the gear is finished. The operator then reaches into the machine, removes the finished gear and replaces it with one to be operated upon. This requires the constant attention of an operator and it also involves certain hazards, because of the need for the operator to place his hands and arms into the machine. These hazards are increased considerably when a great number of identical parts are being run, since the operator, as a result of doing the same thing over and over again, tends to become careless.

It may be seen, therefore, that one of the objectives of the invention is to provide a loading and unloading device for machine tools of the type set forth which may be used to replace an operator for jobs involving long runs of like parts.

A further objective of the invention is to provide a loading and unloading mechanism of the type set forth which is adapted to be synchronized with the performance of the machine with which it is associated to minimize the time that the machine is not actually operating upon a workpiece. Hence, the mechanism substantially increases the workpiece rate of the machine.

Another objective is to provide a mechanism of the type set forth which incorporates a unique safety device adapted to automatically decommission the machine before the operating cycle begins in the event that a workpiece is improperly related to the cutting tool in the machine. This feature prevents damage both to the machine and to the workpiece and insures at all times that a workpiece is in proper position to be operated upon.

Another objective is to provide a loading and unloading mechanism the parts of which are adjustable to accommodate workpieces of different types and sizes.

A further objective is to provide a gear loading and unloading mechanism for a gear shaving machine which may be installed on the machine with a minimum of modification to the machine itself.

A further objective is to provide a gear loading and unloading mechanism which may be shifted relative to the axis of the work centers of a gear shaving machine with which it is associated to accommodate the different crossed axes angles required in the shaving of gears of different types.

Other objectives will be apparent to those skilled in the art from the following detailed description of the drawings in which:

Figure 7 illustrates the carriage at the point in the cycle when an unfinished gear is being placed in position between work centers and a finished gear is being discharged onto the conveyor belt.

Figure 8 shows the carriage during its retracting movement.

Figure 9 is an enlarged fragmentary view illustrating the carriage at the time in its cycle just after an unfinished gear has been deposited upon it for delivery to the work centers.

Figure 10 shows the condition of the loading parts of the carrier during the loading movement just after the condition illustrated in Figure 9.

Figure 11 is a fragmentary side view of the forward end of the carriage showing it in position to pick up a finished gear at the work centers for delivery to the conveyor belt.

Figure 12 is a view similar to Figure 11 showing the forward end of the carriage retracting past an unfinished gear which is in place between the work centers.

Figure 13 illustrates the condition of the parts of the outer end of the carriage at the start of a cycle.

Figure 14 is a fragmentary perspective view showing a preferred means to adjustably mount the mechanism at the apron of the gear shaving machine.

Figure 15 is a fragmentary cross sectional view taken on the line 15—15 of Figure 14.

Figure 16 is a fragmentary cross sectional view taken on the line 16—16 of Figure 15.

Figure 17 is a fragmentary cross sectional view taken on the line 17—17 of Figure 15.

Figure 18 is a schematic layout of the pneumatic system and of the electrical system employed to control the mechanism.

Figure 1:
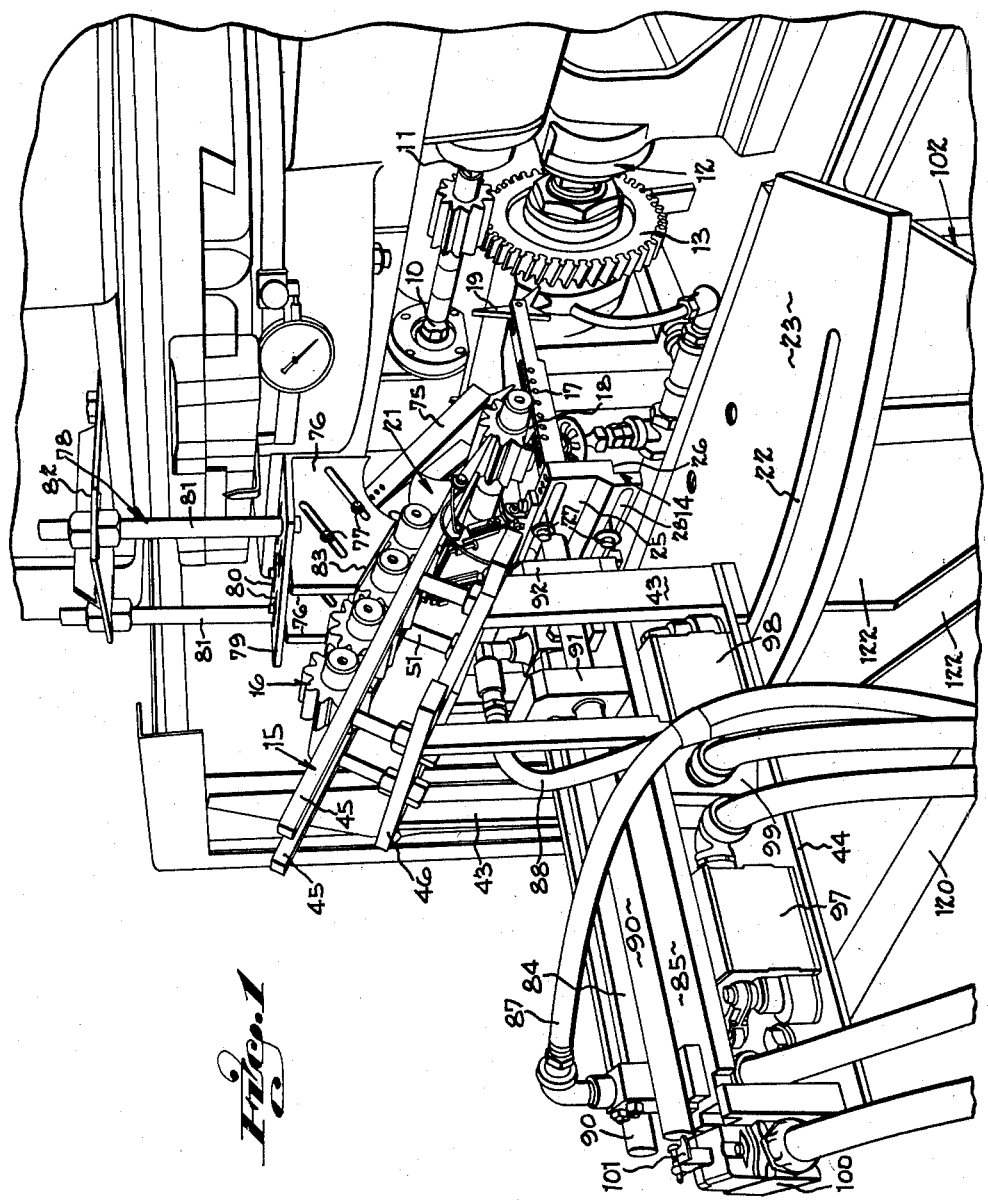
Figure 1 is a perspective view showing the loading and unloading mechanism of this invention associated with a gear shaving machine, only a part of the machine being shown. In this figure the mechanism is shown at the start of its cycle.

In order to explain the operation and construction of the loading and unloading mechanism of this invention it is illustrated in conjunction with a well-known gear shaving machine. Inasmuch as this machine is so well known and is readily available, it is believed unnecessary to go into the details of its construction. The machine includes a pair of work centers designated 10 and 11 respectively and means indicated generally at 12 to mount and drive a rotary gear cutting or shaving tool designated 13. The axis of rotation of the shaving tool is adjustable relative to the axis of the work centers following conventional practices to accommodate different types of gears. This machine is designed to go through a complete operation upon a gear automatically. Briefly, the cycle is as follows: an unfinished gear is placed in position between the work centers, work center 11 moves in and the gear is held in place. At this time the machine is ready to start and the cutter begins its operation, making one or more passes longitudinally of the gear depending upon the amount of material to be removed. At the end of the cycle the machine stops and an indicator light comes on to show the operator that it is safe to reach into the machine to remove the finished gear. Since the loading and unloading mechanism of this invention does away with the need for an operator, the machine circuit to the indicator light is used to initially energize the electrical circuit of the mechanism. This will be explained below in connection with the description of the electrical circuit.

In substance, the mechanism of this invention includes a carriage 14 which is mounted for movement between a retracted position in which it is at the front of the machine and a forward position in which it is inside of the machine. In the first position the carriage is disposed beneath the lower end of a loading rack assembly 15 upon which a number of workpieces, such as the unfinished gears designated generally by the numeral 16, may be placed for delivery into the machine one at a time. The gears are carried into the machine upon the forward movement of the rack by a pair of arms 17—17 the workpieces resting upon cradles 18—18 mounted in the arms. The forward movement of the carriage is arranged so that at its innermost position the longitudinal axis of a workpiece resting upon the cradles is aligned with the axis of the work centers 10 and 11. The arms 17 extend substantially beyond the cradles and at their inner ends they mount a pair of fingers 19—19 which are so arranged that as they move into the machine they pick up a finished gear and deliver it to a discharge point at the same time an unfinished gear is being delivered to its position between work centers. The distance between the cradles and the fingers is arranged so that the finished gear is in position to be dropped upon a conveyor belt, indicated generally by the numeral 20, when the unfinished workpiece is disposed between work centers. Hence, in the inward or forward movement of the carriage a finished piece is discharged and an unfinished piece is loaded. In retracting, the carriage moves out, and in doing so it actuates a combination gate and letdown device indicated generally at 21 which takes the lowermost workpiece from the rack assembly 15 and places it in the cradles 18—18. The movements of the mechanism are so synchronized with the operation of the machine that the carriage begins it inward movement the instant that the machine's cycle is over and it also retracts out of the way of the cutting tool without delay, after delivering an unfinished workpiece, so as to minimize the time that the machine is not actually working upon a piece.

Since different crossed axes angles are necessary in operating upon gears of different design the carriage is mounted for adjustment along an arcuate slot 22 provided in a table 23 which is at the front of the machine. In the present instance the carriage is fastened to the table in a well-known manner by bolts 24 (see Figure 15) which are secured to the underside of a stationary part of the mechanism in which the carriage is reciprocally mounted, these bolts depending through the slot. Hence, upon the loosening of the bolts, the whole mechanism may be shifted in the slot to present the workpieces to the work centers with the longitudinal axis of the workpieces aligned with the axis of the work centers.

The various parts to which general reference has been made will now be described in detail under separate headings.

*Carriage*

The arms 17—17 are secured to a cross head 25. The inner face of the cross head is configured to provide a step 26 in the lower part thereof. The base of each arm is configured to abut against the inner face of the cross head and to engage the step 26 so as to properly align the arm such that it is at the right elevation relative to the cross head and such that it extends horizontally straight away from the face of the cross head. Each arm is secured to the cross head by means of a pair of bolts 27—27, these bolts threading into the base of the arm through slots 28—28 which extend horizontally of the cross head. This construction permits the arms to be shifted sideways of the cross head so that their positions may be changed relative to the cross head and to one another.

The construction of the cradles is best illustrated in Figure 9, each being configured to provide a shallow V at the upper surface thereof and each being mounted in a slot 29 in the arm on a pin 30 which passes through an appropriate bore in the cradle directly beneath the lowest part of the V. The cradle normally is held in a substantially horizontal position by means of a coil spring 31 which is engaged in a small hole at the outer end of the cradle and which has its other end hooked to a rod 32 (extending from the cross head) to pull the outer side of the cradle against a stop pin 33. Pins 30 and 33 may be engaged selectively into adjacent ones of a series of holes 34 in the arm in order to adjust the position of the cradle, within limits, along the arms. It will be noted that the inner side of the cradle can be depressed against the pressure of coil spring 31. Thus, when a workpiece has been delivered to the work centers and the workpiece has been gripped by them, the arms can be retracted to move the cradles out since the inner ends of the cradles are simply cammed down against the pressure of spring 31.

The arms are spaced apart from one another to accommodate the workpiece between them. Now if the workpiece is a spur gear having stub shafts at both sides of it, the cradles can be adjusted to receive the stub shafts so that the gear itself is between the arms. If on the other hand the gear or other workpiece does not have stub shafts or the equivalent, a plurality of dummy shafts or the like may be employed, the gears to be operated upon being slipped over the dummy shafts prior to placing the workpieces in the rack assembly. It should be noted that the stub shaft has a centering hole at each of its opposite ends positioned to receive the work centers 10 and 11. The same type of device may be used in a dummy shaft or its equivalent if the workpieces to be operated upon do not have stub shafts.

The fingers 19 are of identical construction and they are pivotally mounted within slotted inner ends of the arms, the slot in each instance being designated 35. Each finger has two stable positions. These positions are illustrated in Figures 11 and 13 respectively. In the position of Figure 11 each finger presents a shallow V upwardly, the angle of the V approximating the angulation of the sides of the cradles. This is a conveying position for the fingers wherein they transport a finished gear from the work centers toward the discharge position. In the second stable position of Figure 13 the finger is tilted. This is the discharge position. These two positions are stabilized by means of a ball detent 36 inside of the finger which is engageable alternately with one of two notches 37—37. These notches are cut into the side of a pin 38 upon which the finger is pivoted between the outer ends of the arm. The pin is fixed relative to the arms. Each finger also includes a projection 39. This projection is positioned to be engaged by means of a trip dog 40 which is mounted adjacent to the conveyor, there being two such trip dogs, one for each finger; and they are so positioned relative to the arms of the carriage that the last part of the inward movement of the carriage causes the projections of the fingers to engage the trip dogs and thereby pivot the fingers to dump a workpiece from them onto the conveyor.

The position of the finger shown in Figure 12 is an unstable one. In the instance shown, the carriage is being retracted and in order to permit the fingers to pass a workpiece in place between the work centers they must swing down out of the way as shown. A wire spring 41 which has one end secured to the arm has a hook 42 at its opposite end engageable with one side of the finger when it is swung down upon striking the workpiece during the retracting movement. The spring is configured so that immediately after the finger clears the workpiece it returns the finger to the upright position of Figure 13. In this position, which is a stable one since the ball detent is engaged in one of the notches in pin 38, the finger is ready to pick up a workpiece from the work centers on the next forward movement of the carriage. In this movement the inner side of the upstanding finger engages the workpiece and the finger is swung down into the second stable position of Figure 11 to cradle the workpiece. By synchronizing the movement of the carriage with the work centers that piece is released as soon as the fingers are in the position of Figure 11 ready to receive and deliver the workpiece to the discharge point.

Loading rack

The rack assembly is arranged to hold a number of pieces to be operated upon and to feed the pieces by gravity toward the gate and let-down mechanism 21 where a piece is released each time the carriage returns to its retracted position.

As shown, the rack assembly is supported by four uprights or legs 43—43. These uprights are in turn mounted upon a base plate 44 which is secured to table 23 by the bolts 24 to which reference has been made. The rack is slanted down at approximately 30 degrees relative to base plate 44 toward the gate assembly. The stub shafts of gears to be operated upon ride on a pair of rails designated 45—45 respectively. These rails are attached to a frame 46 which is secured directly to the upper ends of the uprights 43. Referring now to Figure 9, each rail is slotted through from top to bottom at places adjacent to its upper and lower ends. One such slot is illustrated at 47 in Figure 9. Each slot has a step 48 in it so that the underside is narrower than the upperside. The slot 50 receives a lock bolt 49 which has a head on it sufficiently large to span the narrower part of the slot, resting upon the two shoulders provided by step 48. This lock bolt engages into a threaded bore 50 which is provided in the upper end of a threaded stud 51. The threaded stud, in turn, extends down through a transverse slot 52 in frame 46 and is secured therein by means of a pair of lock nuts 53—53 which are tightened onto the threaded stud above and below the frame. Four such slots and threaded studs are provided. The longitudinal slots in the rails 45 thus provide a means for adjusting the rack toward and away from the cradles on the carriage, whereas the transverse slots 52 in frame 46 permit the two rails to be adjusted toward and away from one another to accommodate workpieces of different sizes. In addition, the threaded stud and lock nuts permit the rails to be raised and lowered relative to frame 46. In this way the two rails can be positioned as required by the workpieces being operated upon. Obviously, the rails can be extended to accommodate more workpieces than the number shown in the drawings, and, in addition, a magazine (not shown) can be employed in conjunction with the rails to increase the workpiece capacity of the rack assembly.

Referring again to Figure 9, the gate and let-down assembly 21 is mounted at the lower ends of the rails 45— 45 with the two gates themselves, indicated at 54—54, each being pivotally mounted within a slot 55 in the rail upon a cross pin 56 so that the gate can rock within the slot. Since the gate assemblies are identical, reference is made to only one of them in the following description. The underside of the gate has a rocker arm 57 affixed to it, the rocker arm, when the gate is in closed position, residing against the underside of the rail above pivot pin 56. The rocker arm is slotted longitudinally and it is secured to the underside of the gate by means of a pair of machine screws 58 so that the overall length of the rocker arm can be adjusted relative to the gate. The upper end of the rocker arm (in the position of Figure 9) includes a mount bracket having a cross pin 59 therein which pivotally mounts a gate actuator 60. The actuator is made in two parts which are bolted together as at 61 so that the overall length of the gate actuator can be adjusted. The outer end of the gate actuator is configurated to provide a keyhole shaped slot 62 having a flaring throat 63. The cross head 25 of the carriage has a bracket 64 mounted upon it which carries an actuator pin 65. This pin is cut so as to provide a substantially narrow key which may be engaged into keyhole slot 62 when the gate and let-down assembly is in the position of Figure 10. This position is the closed position for the gate. The angular position of the actuator may be adjusted relative to the rocker arm by means of an adjustment screw 66 which threads through a lug 67 into engagement with the adjacent end of the rocker arm. This adjustment is provided so that the keyhole slot 62 can be aligned exactly with the path of actuator pin 65 and thereby engage into the keyhole slot during the retracting movement of the carriage. Once the pin is thus engaged the continued retracting movement causes the assembly to pivot around cross pin 56 which mounts the gate. It will be seen from a comparison of Figures 9 and 10 that this turning movement locks the actuator pin 65 within the keyhole slot during the latter part of the carriage movement. The parts are related such that the gate swings through 90 degrees from the position shown in Figure 10 to the position of Figure 9.

The gate itself comprises an arcuate quadrant portion 68 and a tapering track portion 69. With the carriage forward, delivering a piece to the work centers, track 69 extends up at substantially 90 degrees to the rails 45—45. In this position the lowermost piece on the rack assembly is received in an inwardly curved portion 70 which is between the quadrant 68 and track 69. When the actuator pin engages into keyhole slot 62 during the latter part of the retracting movement of the carriage the gate is swung through 90 degrees which causes the piece resting upon the curved portion 70 to roll down track 69 and to drop onto the cradles. At the same time, however, the arcuate quadrant 68 swings up, stops the downward movement of the next piece on the rack assembly and holds it until the carriage again starts to move into the machine. A wire spring 71 is provided to bias the gate into the position of Figure 10 wherein the track 69 is elevated. In the instance shown, one end 72 of the wire spring 71 is engaged with the frame 46 of the rack assembly. The opposite end 73 is engaged with cross pin 59 which pivotally mounts the actuator. Intermediate these two points, as at 74, the spring is coiled around the pivot pin 56 for the gate. Hence, when the actuator pin is engaged in the keyhole slot, with the carriage retracted, the spring is under tension. As soon as the carriage starts into the machine the spring starts to swing the rocker arm down into the position of Figure 10 which raises the gate and permits the piece which is now lowermost on the rack to roll onto the curved portion 70 of the gate. It will be seen, therefore, that the gates permit only one piece at a time to pass and that they direct the pieces onto the cradles 18—18.

To prevent pieces from going past one another on the rack and to insure that they drop onto the cradles, guide bars 75 are provided above the rack assembly, these bars being adjustably mounted in guide brackets 76. In the instance shown, the upper ends of the guide bars have a series of holes in them, the guide brackets are slotted, and the bars are secured to the brackets by means of bolts 77 passing through slots in the sides of the brackets 76. In this way the positions of guide bars may be shifted to accommodate work pieces of different sizes.

Although the guide bars and brackets 75 and 76 respectively could be attached to the rack assembly, it is preferred that they be suspended from the head of the machine by the mount device which is indicated generally at 78. (See Figure 1). This mount device may include a horizontal plate 79 from which the two guide brackets 76—76 depend. The guide brackets are fastened to the underside of the plate by bolts engaged in transverse slots 80 in the plate to permit the brackets to be adjusted toward and from one another. The plate 79 is secured to the lower ends of a pair of uprights 81 which, in turn, are secured to a mount bracket 82 fastened directly to the head of the machine. Preferably the upper ends of the uprights are threaded and they are locked to the mount bracket by pairs of lock nuts so that the positions of the guide brackets 76 may be shifted up and down. This adjustment is also provided to accommodate pieces of different sizes, it being noted that the lower ends of the guide brackets are cut at an angle to provide straight edges 83—83 which are parallel to the rails 45—45 of the rack assembly.

Carriage actuation

Figure 2:
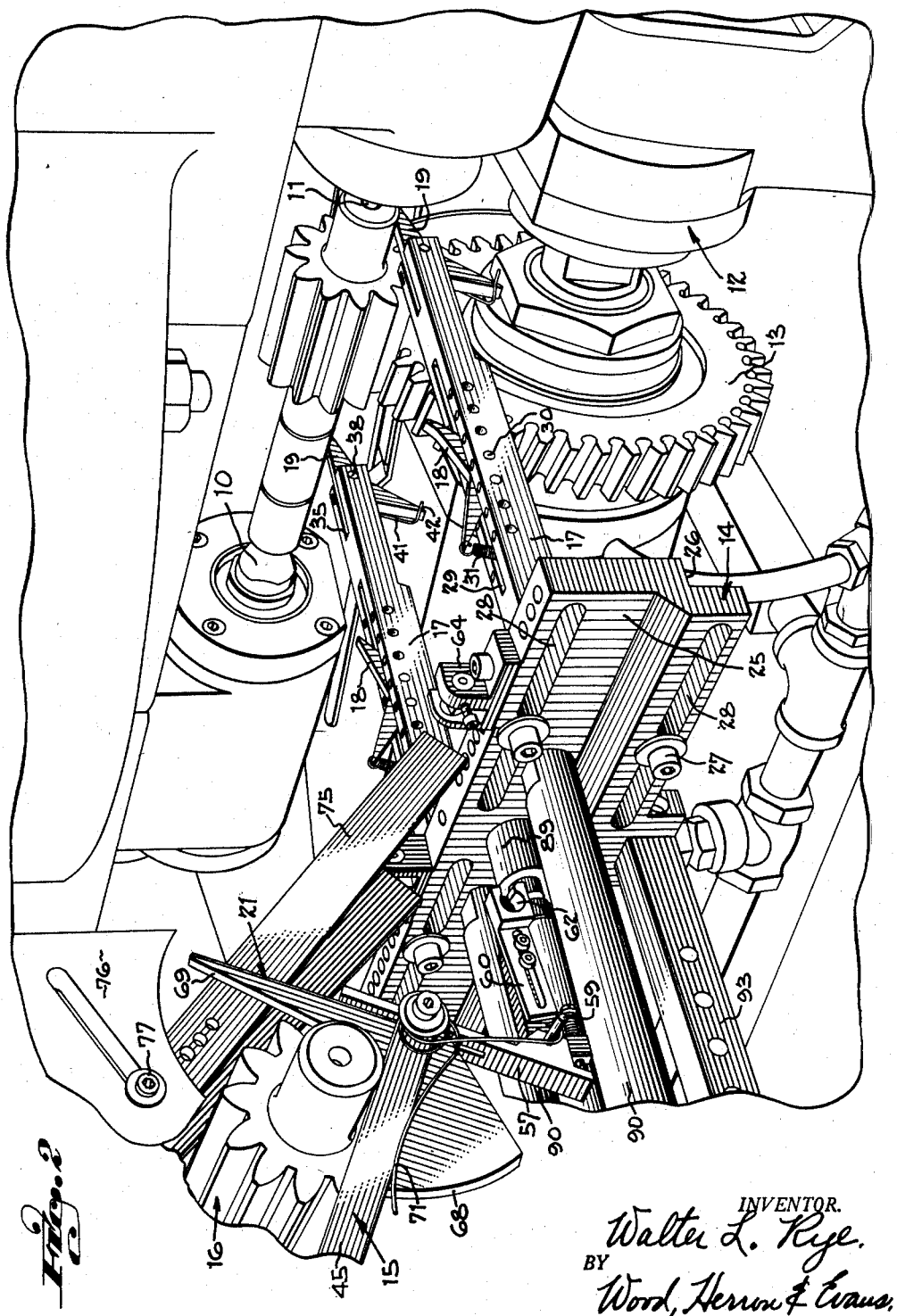
Figure 2 is an enlarged perspective view showing parts of the mechanism in the retracting part of its cycle.

In the instance shown the carriage is powered pneumatically. It will be obvious, however, that it may be powered hydraulically or that it may be driven by an electric motor if desired. The essential requirement is to provide some means to move the carriage in and out relative to the work centers in timed sequence with the operation of the machine and in a way to minimize the time that the machine is not actually operating upon a part. As shown, an ordinary air cylinder 84 is used. This air cylinder is mounted on top of a flat guide plate 85, which guide plate is mounted in spaced parallel relationship to base plate 44. The outer end of the guide plate is mounted upon vertical legs 86. The forward end of the guide plate is secured to the inner pair of legs 43—43 which support the rack assembly. There are two air lines 87 and 88 which are connected to the air cylinder, the one designated 87 going to the outer end of the cylinder and the one designated 88 going to the inner end of the cylinder. These lines serve alternately as pressure lines and exhaust lines to drive a piston, not shown, back and forth inside of the air cylinder. A piston rod 89, see Figure 2, extends from the forward end of the air cylinder and it is attached directly to the cross head to drive the carriage. There are, in addition, two guide rods 90—90 which are attached to the outer face of the cross head at the opposite sides of and in parallelism with the piston rod 89. The two guide rods are slidably mounted in spaced guide brackets designated 91 and 92 respectively. The latter brackets are provided in pairs at the opposite sides of the air cylinder adjacent to its inner end. The guide bars 90 serve to stabilize the carriage and to hold it in a horizontal position during its movement. There is a fourth member secured to the cross head which is shown at 93. This member is an electric switch actuator bar and it extends from a point of attachment to the cross head parallel to the air cylinder and directly underneath of the guide plate 85. The switch actuator is merely pinned as at 94 to the cross head and it rides on a roller 95 which is located between the legs 43—43 at the inner end of base plate 44. The outer end of the switch actuator bar 93 is forked and it mounts a guide roller 96 which tracks along the underside of guide plate 85 during the carriage movement. Switch cams are mounted on the bar and these will be described at a later point in connection with the detailed description of the electrical circuit for the machine. Briefly, however, these cams are adapted to operate switches located within three switch boxes. One of these boxes shown at 97 is located at the right side of the switch actuator bar adjacent to the outer end of base plate 44 and it comprises a main switch for the machine. That is, the cutting cycle cannot start unless the switch within this box is closed and this switch is closed only when the carriage is in its fully retracted position. The second switch box at the right side of the switch actuator bar is designated 98 and it is mounted adjacent to the inner end of base plate 44. The switch with this box is actuated when the carriage reaches the position to align a workpiece with the work centers. This is a safety switch and it will be referred to in the description of the electrical circuit as the "work center" switch. The third switch box is indicated at 99 and it is at the left side of the switch contact bar. The switch within box 99 is a double throw type and one set of contacts is closed when inward movement of the carriage is initiated. The second set of contacts is closed when the carriage is retracted fully but it becomes effective momentarily only at the start of the carriage cycle. All three switch boxes actuate solenoid operated valves to control the flow of air pressure through the various hoses for moving the carriage. A fourth switch box designated 100 is provided having a switch arm 101 thereon which is engaged by the guide rod 90 at the right side of the air cylinder only when the carriage is in fully retracted position. The operation of this switch as well as the others will be explained in the description of the electric circuit.

Attachment to machine

The numeral 102 generally identifies an elevating device which may be used to raise and lower the loading and unloading mechanism relative to the work centers of the machine. This device is mounted on the apron, indicated at 103, of the gear shaving machine. The elevating device is centered on the apron and it is secured to it by means of an upper mounting plate 104 and a lower mounting bracket 105. Both of these elements are secured to the apron by means of bolts indicated generally at 106 in the case of the upper mounting plate and at 107 in the case of the lower mounting bracket. The upper plate 104 is the stationary part of a dovetail slide assembly whereas the lower bracket constitutes a supporting base for a journal 108. The journal 108 includes a bearing for an elevating screw 109, this screw extending vertically upwardly from the journal. A hand wheel 110 is provided for rotating screw 109. The upper portion of this screw is engaged in an internally threaded sleeve 111. This sleeve constitutes a nut, and it is engaged at its upper end with the movable part of the dovetail slide assembly which is designated 112. It may be seen from Figure 17 that the upper end of sleeve 111 is slotted and that a key 113 is provided on the lower end of the movable part of the dovetail slide which is engaged into this slot so as to prevent the sleeve 111 from rotating when the screw is turned. The slide itself is otherwise of conventional construction including an adjustable shim 114 at one side thereof to take up for wear.

The table 23 to which reference has been made previously is bolted to the upper end of the movable part 112 of the dovetail slide, this table carrying the base plate 44 and the uprights 43—43 which mount the loading rack. The lower end of the movable part 112 of the dovetail slide has an arcuate plate 115 bolted to it as shown at 116 so that the plate moves up and down with the slide 112. The outer edge of the segment plate is stepped as shown at 117 and it includes a series of arcuate slots 118. A bolt 119 engaged up through a slot 118 threads into the lower end of an angle brace 120 which extends out away from the apron of the machine and has its upper end bolted as at 121 to the outer end of the base plate 44 so as to provide support for it. The table 23 is additionally supported by four triangular shaped webs 122. Two of these webs are parallel to one another and extend straight out from the front of the apron, whereas the other two webs extend to the two sides. The webs may be bolted or otherwise secured to part 112 of the dovetail slide and to the underside of table 23 following conventional practices.

It may be seen therefore that the entire mechanism may be elevated or lowered relative to the work centers simply by turning the adjustment wheel 110 one way or the other. In addition, it may be seen that by loosening the bolt 24, which fastens the base plate 44 to table 23, and also by loosening the bolt 119, which fastens the lower end of the angle brace to the segment plate 115, the path of the carriage relative to the work centers may be shifted or angulated as desired. The elevating device shown is adapted to be attached to the existing apron of a gear shaving machine of the type without making substantial modifications in the construction of the machine. It will be apparent to those skilled in the art that various modifications in the elevating mechanism may be made in order to accommodate machine tools of different types.

Conveyor belt

Figure 3:
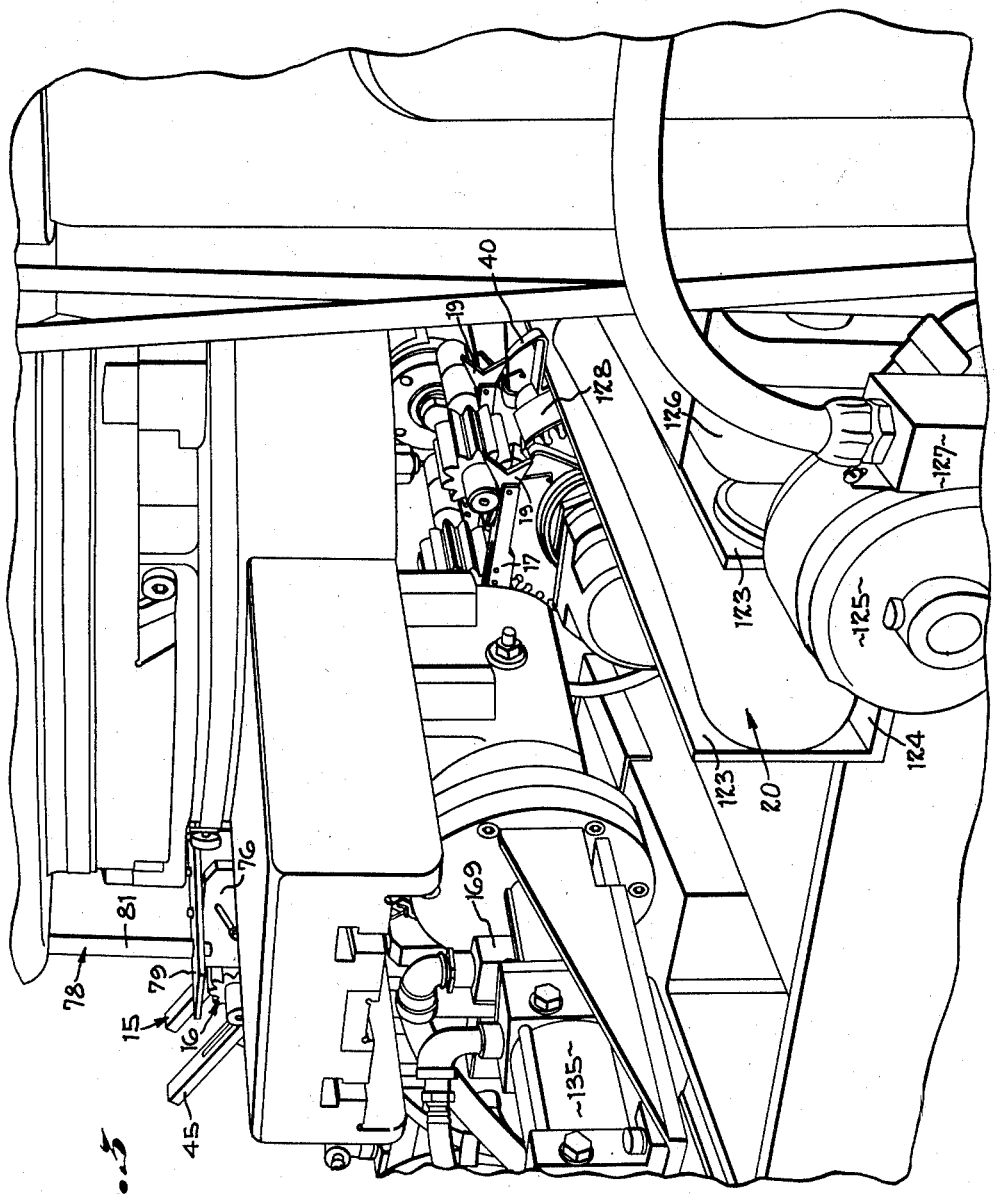
Figure 3 is a fragmentary perspective view showing a finished gear ready for discharge from the machine onto a conveyor belt.
Figure 4:
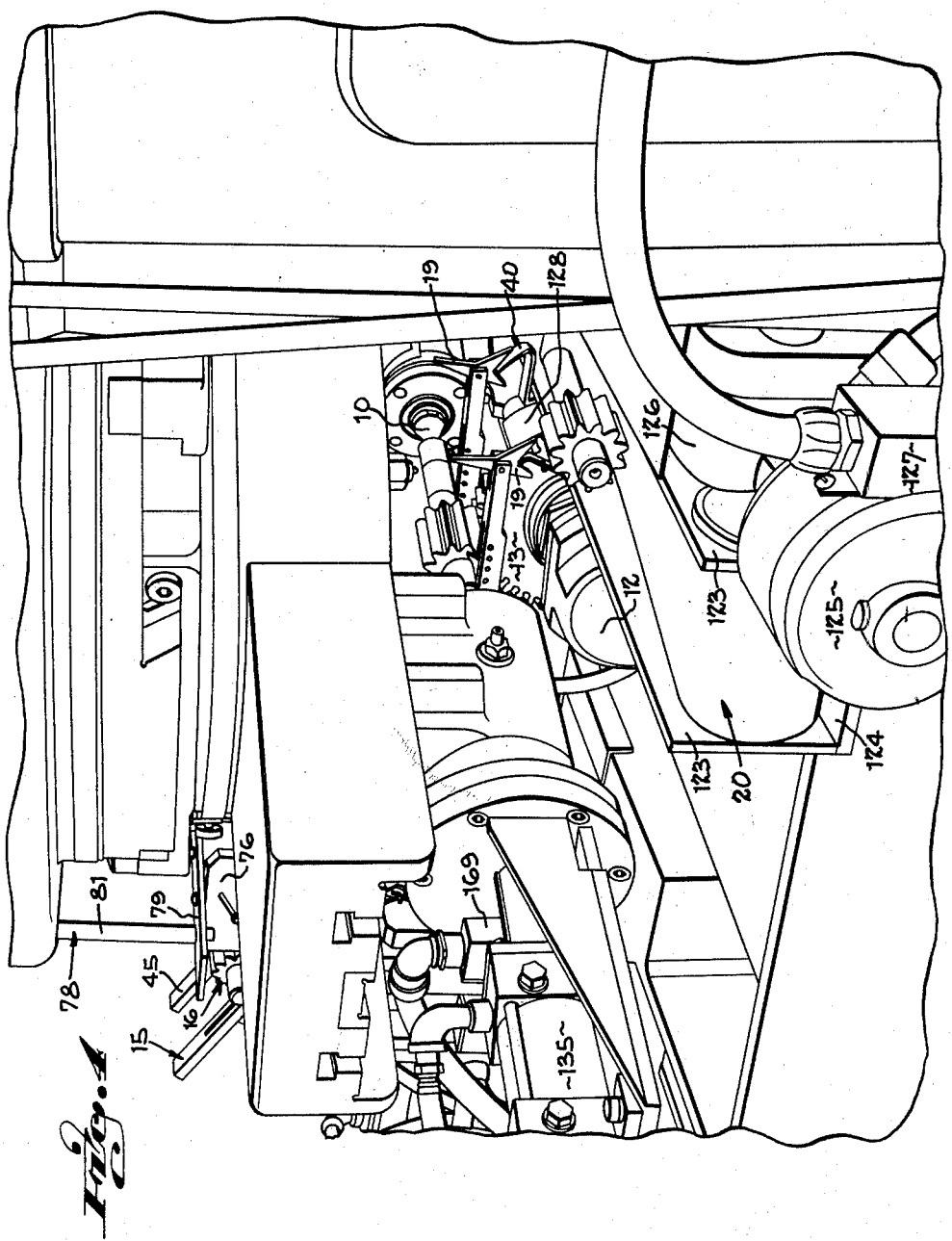
Figure 4 is a view similar to Figure 3 showing a finished gear on the conveyor belt and an unfinished gear being placed between the work centers of the machine.
Figure 5:
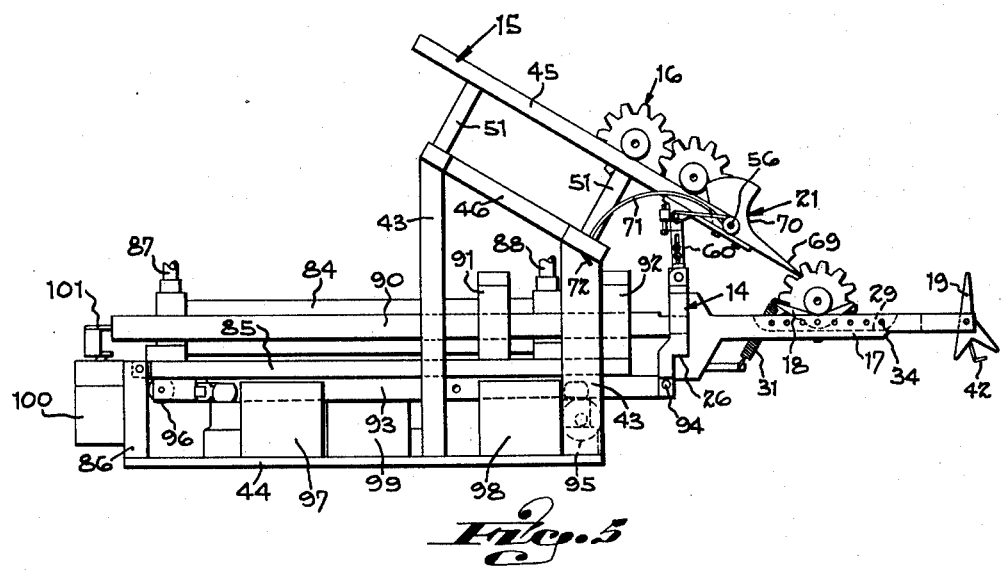
Figure 5 is a diagrammatic view illustrating the carriage of the loading and unloading mechanism at the start of a cycle.
Figure 6:
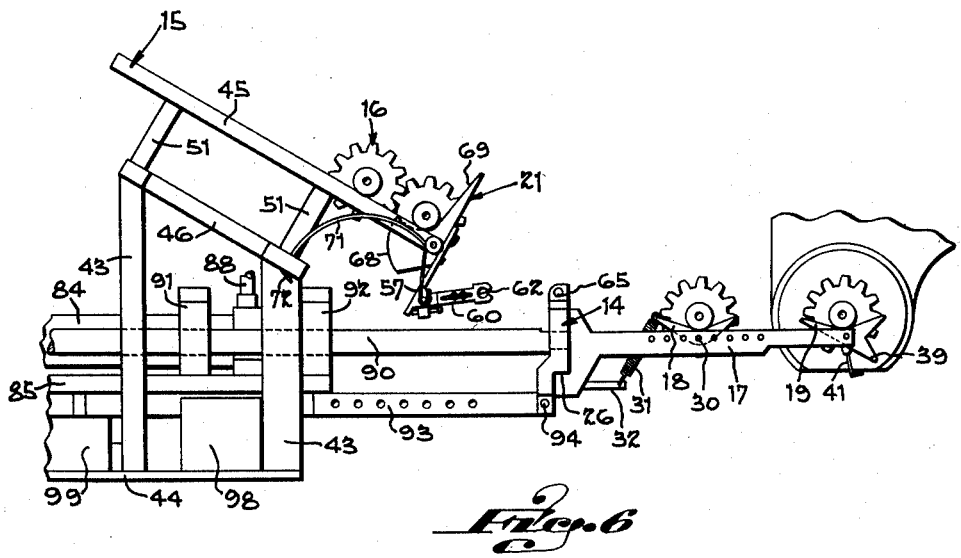
Figure 6 is a view similar to Figure 5 illustrating the carriage in position to pick up a finished gear at the work centers, with an unfinished gear being delivered to the work centers.

The conveyor belt assembly is of conventional construction comprising the belt already identified by the numeral 20, a pair of side walls 123—123 which extend sufficiently far above the upper surface of the belt to prevent pieces thereon rolling off the sides, and a base 124. The belt is driven by an electric motor 125 through a speed reduction gear box 126. As shown in Figure 3 the motor is controlled through a pneumatically operated switch mounted within a switch box 127. The switch may be arranged so that it operates in synchronization with the machine such that the conveyor belt is driven intermittently only. If desired, the belt may be operated continuously without affecting the other parts of the assembly. From Figure 3 it will be noted that the two trip dogs 40—40 are secured to the side wall 123 of the conveyor assembly in line with the two fingers at the inner ends of the arms 17—17 of the carriage 14. The dogs have their upper ends hooked over so as to engage with the fingers. In addition, a small plate constituting a chute 128 may be provided to guide the workpieces in order to insure that they are discharged onto the conveyor belt over side wall 123. This chute may be bolted directly to the side wall if desired. The movement of the conveyor belt in the instance shown of Figure 3 is toward the observer and a parts box may be placed underneath the discharge end of the conveyor to catch the workpieces as they leave the machine.

Electrical circuit and pneumatic system

Reference is now made to Figure 18 of the drawings. The electric circuit to operate the carriage is taken from two wires on the machine which, before modification to accommodate the loading and unloading mechanism of this invention, energize an indicator light shown diagrammatically by phantom lines at 129. The light is one designed to come on at the end of a cutting cycle to indicate to the operator that the machine is ready to load. Generally, therefore, the electrical circuit is energized at the end of a cutting cycle and is deenergized at the start of the cutting cycle which is the time when the indicator light would be on in an unmodified machine. One of the wires, indicated at 130 goes to a terminal 131 of a solenoid operated valve designated W.C. (an abbreviation of "work centers"). This same wire also goes to a terminal 132 of a solenoid operated valve designated Car. (an abbreviation of "carriage"). The solenoid operated valve W.C. is connected by two pneumatic lines 133 and 134 to an air cylinder 135 which actuates work center 11. The two lines go to the opposite ends of the air cylinder and a piston, not shown, inside of the cylinder is driven one way or the other depending upon the line which is under pressure. The valve W.C. is further arranged so that at any time it is not being energized electrically the air line 134 is under pressure. This moves the work center 11 toward the left as shown to hold an engaged workpiece in place. Thus, if for any reason there should be a failure of electrical power to the machine, the gear will be held in place securely between the work centers so as to not damage the cutting tool. Valve W.C. is supplied with air under pressure through a line 136 from a source not shown. Air is exhausted from valve W.C. through a line 137. Normally when valve W.C. is not energized air under pressure flows through line 134 to the air cylinder 135. At this time air is exhausted from the opposite end of the cylinder through line 133 back to valve W.C. and then to the exhaust line 137. This holds the work center 11 in the position shown in Figure 18 in engagement with the workpiece. When valve W.C. is energized electrically, air under pressure is directed to line 133 to move the work center toward the right and thereby release the workpiece. Air, in this case, is exhausted through line 134, valve W.C. and exhaust line 137.

The valve designated Car. operates substantially in the same way that valve W.C. operates, i.e., when the solenoid operated valve Car. is not energized air flows through a line 138 from the source of air pressure through valve Car. and a line 139 to the forward end of the air cylinder 84 for the carriage to cause the carriage to retract. At the same time, air is exhausted from the outer end of the cylinder through a line 140, to valve Car., and thence to an exhaust line 141. Unless valve Car. is energized electrically, therefore, the air cylinder 84 retracts. Thus, in the event of a power failure the carriage automatically retracts. On the other hand when valve Car. is energized the flow of air pressure is through line 140 to move the carriage into the machine with the air ahead of the piston being exhausted through line 139, valve Car., and exhaust line 141.

The two solenoid operated valves are energized during a loading cycle as follows: The second wire of the indicator light circuit is designated 142. This wire goes to a terminal 143 (at bottom of diagram) which is connected to one of the contacts of switch 100 by means of a lead 144. With the carriage in its fully retracted position switch 100 is closed and the circuit is completed to valve Car. through the switch 100, a lead 145, a terminal 146 and thence through a line 147 to a second terminal 148 at valve Car. The other terminal 132 of this valve, being connected to wire 130, permits current to flow through the solenoid thereby directing air pressure through the line 140 to the carriage air cylinder 84. This initiates the inward movement of the carriage.

Attention is now directed to switch box 97. With the carriage in retracted position, two contacts 149 and 150 inside of the switch box 97 are closed to permit a flow of current through two leads 151 and 152 to the machine circuit.

Switch 97 is primarily a starter switch for the machine. It becomes effective when the carriage is in the very last part of its retracting movement. A cam bar 153 on the side of actuator bar 93 contacts the arm of the switch 97 to close it across leads 151 and 152. These two leads are connected to a relay on the electric panel of the machine to initiate the cutting cycle. Switch 97 is closed tightly before switch 100 is contacted. Initiating the cutting cycle at this time deenergizes the circuit to indicator lamp 129 and, therefore, since no current is flowing through the wires 130 and 143, the carriage simply moves to its fully retracted position and remains there during the cutting cycle. Switch 97 also operates, in a sense, as a holding switch during the very first part of the inward movement of the carriage. This provides time for the machine circuit to completely de-commission itself, permitting all relays to condition limit switches etc. This particular switch is found necessary upon the machine shown in the drawings, but it will be obvious that it may be used solely as a means to stop the cutting cycle in another type of machine tool. In this particular function switch 97 takes the place of a final limit switch which in another machine tool might be controlled by a timing device or used in conjunction with a timing device.

In the first part of the inward movement of the carriage the circuit to valve Car. is transferred from switch 100 over to switch 99, switch 100 serving to merely initiate the inward movement and then opening. In the condition of the circuit shown in Figure 18, one set of contacts designated 154 and 155 in switch 99 respectively are open. The contact 154 is connected by a lead 156 to terminal 146 on wire 147, which wire goes to the terminal 143 of the solenoid operated valve Car. The other terminal 155 in switch 99 is connected by means of a lead 157 to terminal 143 which is on wire 142. The switch arm of switch 99 is contacted by a cam bar 158 on the left side of the cam actuator bar to close the contacts 154 and 155. This maintains the flow of electricity to the solenoid of valve Car. thereby continuing the inward movement of the carriage.

Another set of contacts 159 and 160 are provided in switch 99 and at the same time that the circuit is closed across contacts 154 and 155, the circuit through contacts 159 and 160 is broken. This circuit goes to the relay in the machine which controls the reversal of the movement of the cutting tool. Under ordinary circumstances the instant that a cutting cycle is completed the cutting tool lowers away from the underside of the finished gear. It is found that the return movement of the cutting tool in the machine shown is too slow for efficient operation of the loading and unloading mechanism. Hence, the normal cycle of the lowering and raising of the cutting tool is shortened by reversing the downward movement before the lowest point is reached. This means, of course, that the clearance between the cutting tool and a gear being placed between work centers is reduced over the clearance provided when the machine is being hand loaded. Actually, it is found that in mechanized loading this clearance does not have to be substantially more than the amount of metal removed from a gear in a cutting operation. The gear, being delivered to the work centers, simply meshes with the teeth of the cutting tool and adjusts itself to the tool while being moved into position in alignment with the work centers. The larger amount of clearance provided in a hand loading operation is necessary to prevent damage to the teeth of the tool. However, in the present operation since the gear is delivered in cradles to the loading point and in a straight line movement there is no danger of the tool being forcibly struck as would be the case in hand loading.

It may be seen that both of the cam bars 153 and 158 on actuator bar 95 are elongated in the direction of travel of the bar. In addition, the two bars are so disposed relative to one another that the inner end of cam bar 153 contacts the arm of switch 98 prior to the time that the outer end of cam bar 158 leaves switch 99. Once the bar 158 passes this switch arm, the circuit through switch 99 to the solenoid operated valve designated Car. is opened at this point, but this happens after switch 98 is closed. Switch 98 includes two contacts 161 and 162. One of these contacts is connected to a terminal 163 of solenoid operated valve W.C. by means of a lead 164. The other contact 161 is connected to a terminal 165 on the wire 142. Thus, when switch 98 closes, as a result of being contacted by the inner end of cam bar 153, current flows through valve W.C. from wire 130 and terminal 131, thence through the lead 164, switch 98, the terminal 165 and wire 142, which completes the circuit. This conditions the solenoid operated valve W.C. to direct air under pressure to the air cylinder of the work center 11 through line 133 as previously described. The valve 98 therefore is disposed relative to cam bar 153 such that the valve closes at the time that the fingers at the outer ends of the carriage arms are in position to receive a workpiece. Closing the switch 98 moves the piston in air cylinder 135 to the right which opens the work centers to free the workpiece so that it can be transported from the work centers to the unloading point.

When the piston within cylinder 135 moves toward the right an extension 166 of work center 11 is moved to the right which misaligns a V-shaped notch 167 in the underside of the extension with respect to a switch arm 168 of a safety switch designated generally 169. When the extension 166 moves to the right, switch arm 168 is forced downwardly to close two contacts 170 and 171. The closing of switch 169 causes current to flow from wire 130 into the solenoid of valve Car., from valve Car. to a terminal 172 on line 147. Terminal 172 is connected to the contact 171 by means of a lead 173. The other contact of switch 169, namely contact 170, is connected by means of a lead 174 to a terminal 175 which is on wire 142. The closing of the switch 169, therefore, maintains the solenoid in valve Car. in an energized condition which continues the inward movement of the carriage. When valve 198 switch 169 first energizes valve Car., the valve Car. is also being energized from switch 99. Shortly thereafter, however, the arm of switch 99 falls from the outer end of cam bar 158 and it opens so that the final inward movement of the carriage is a result of valve Car. being energized solely through closed switch 169. The opening of the two contacts 154 and 155 in switch 99 also causes contacts 159 and 160 to close which, were the machine in a cutting cycle, would cause a reversal of tool movement in the machine as previously described. However, at this time the machine itself is de-commissioned and thus the closing of contacts 159 and 160 has no effect. The length of cam bar 153 is equal to the distance between the cradles and the fingers on the carriage arms. Thus, from the time that switch 98 is first contacted it remains closed to hold the work center 11 open. As a result of safety switch 169 being closed, valve Car. is energized and the inward motion of the carriage continues. However, once the cam bar 153 moves past the switch arm of switch 98, switch 98 opens, valve W.C. is de-commissioned and air pressure is directed to the air cylinder 135 for the work center 11 to cause it to move in. The opening of switch 98 takes place when an unfinished workpiece on the cradles of the carriage arms is aligned with the work centers so that work center 11 can move in and engage it. If for any reason no workpiece is presented to the work centers, the notch 167 in the extension 166 of work center 11 moves past switch arm 168. The misalignment of the notch 167 with the switch arm 168 closes contacts 170 and 171 and thereby reenergizes the solenoid operated valve Car. through terminal 172, lead 173 and lead 174. Since this latter type of misalignment between notch 167 and switch arm 168 can only take place when the carriage is in its innermost point of travel. The reenergization of valve Car. simply holds the carriage in place to insure that the cutting tool is not damaged by a misaligned workpiece being pulled back over the cutting table. Also in the event that the workpiece is not properly aligned with the work centers so that the work center 11 cannot move into its proper workpiece holding position, notch 167 is misaligned with switch arm 168 and the carriage is held in position until the situation is corrected. Hence, the safety switch 169 can only open when a workpiece is properly engaged and held between the work centers, because it is only under these circumstances that notch 167 is in position to be engaged by switch arm 168.

When a workpiece is properly engaged in the work centers switch 169 opens, the circuit to solenoid operated valve Car. is broken and air under pressure is directed through the line 139 to retract the carriage.

For purposes of illustration the various switches 97–100 are shown as having straight switch arms which are spring-urged toward the opening position. Actually these switches are toggle operated so that they are not effected by the return motion of the actuator which causes the two cam bars 153 and 158 to pass them. In other words, the passing of the cam bars in the reverse direction has no effect upon the various switches.

In substance, therefore, switch 100 initiates the inward movement of the carriage when the circuit to wires 130 and 142 is completed in the machine by the means which ordinarily in a hand operated gear shaving machine would energize indicator light 129. The first part of the inward or loading movement breaks switch 97 to de-commission the machine and it also closes the contacts 154 and 155 in switch 99 to maintain a flow of current to valve Car. and thereby continue the inward movement. When the inner end of the cam bar 153 strikes the arm of switch 98 this switch is closed which energizes solenoid operated valve W.C. to open the work centers, the carriage being in position to receive the workpiece. The opening movement closes switch 169 to maintain a circuit through valve Car. and thereby it continues the inward movement, this movement transporting a finished workpiece from the work centers to the unloading position. When the carriage is all of the way in, the switch arm of switch 98 drops off the outer end of cam 153 causing this switch to open, de-commissioning the solenoid of valve W.C. which moves the work center 11 into position to grasp a workpiece on the cradles. If the workpiece is properly positioned relative to the work centers, notch 167 aligns with switch arm 168 and switch 169 opens to de-commission the solenoid of valve Car. so that the carriage retracts completing the loading and unloading cycle.

Having described my invention, I claim:

1. Loading and unloading mechanism for a machine tool of the type having work centers between which a workpiece is adapted to be held during an operation upon said workpiece, said mechanism comprising a loading rack disposed at the front of the machine adapted to hold a plurality of pieces to be operated upon, a carriage adapted to reciprocate between the rack and a discharge point beyond the work centers in a line at right angles to the axis of the work centers, a pair of cradles on said carriage adapted to receive the opposite ends of an unfinished workpiece and carry the workpieces between them, tiltable pick up means at the end of the carriage adjacent to the work centers adapted to receive the opposite ends of a finished workpiece at the work centers, means operable by carriage movement to discharge an unfinished workpiece from the rack onto said cradles each time the carriage moves to said rack, means to tilt and thereby release a finished workpiece from the tiltable pick up means each time a finished workpiece is delivered to said discharge point, whereby during each movement of the carriage from the rack to the discharge point an unfinished workpiece is delivered to the work centers and a finished workpiece is delivered to the discharge point, and means to reciprocate the carriage in timed sequence with respect to the cutting cycle of the machine.

2. Workpiece loading and unloading mechanism for a gear shaving machine of the type having work centers adapted to close toward one another upon a gear to be operated upon, said machine tool further being of the type having electrical means to control the cycle of operation thereof, said mechanism comprising a carriage mounted to move horizontally and in a direction at right angles to the axis of the work centers, and having cradle means thereon to carry an unfinished gear to the work centers and having pick up means thereon inwardly of the cradles to receive and carry a finished gear from the work centers to a discharge point, switch actuators mounted upon the carriage, a plurality of switches in position to be engaged successively by said switch actuators, an air cylinder to drive said carriage toward and away from said work centers, a solenoid operated valve to control the application of air pressure to said air cylinder, a first switch of the plurality connected electrically with said solenoid operated valve adapted, upon being contacted by a switch actuator to condition the solenoid operated valve to move the carriage inwardly toward the work centers, a second switch, a second solenoid operated valve adapted to direct air under pressure to an air cylinder adapted to move one of the work centers toward and away from workpiece engaging position, the second switch connected electrically with the second mentioned solenoid operated valve, said second switch being positioned to be engaged by a switch actuator at a time when the carriage is in a position to present the pick up means to the work centers for opening said work centers, a third switch associated with the work centers and adapted to be closed upon movement of the work center away from workpiece engaging position, the third switch being connected electrically to the first mentioned solenoid operated valve whereby continued inward movement of the carriage is by current passing through the third switch only, the second mentioned switch adapted to open at the innermost end of the travel of the carriage, thereby permitting the work center to close upon a workpiece on the cradle means, and the first mentioned solenoid operated valve adapted to direct air pressure to the carriage cylinder to cause said carriage to retract at any time the first mentioned solenoid operated valve is not energized.

3. Workpiece loading and unloading mechanism for a gear shaving machine of the type having work centers adapted to close endwise upon a gear to be operated upon, said machine tool further being of the type having electrical means to control the cycle of operation thereof, said mechanism comprising a carriage having means thereon to carry an unfinished gear to the work centers and having pick-up means thereon inwardly of the cradles to receive and carry a finished gear from the work centers to a discharge point, said carriage moving in a horizontal plane and in a direction at right angles to the axis of the work centers, switch actuating means movable with said carriage, a plurality of switches engageable successively by said switch actuating means, an air cylinder to drive said carriage, a solenoid operated valve to control the application of air pressure to said air cylinder, said valve adapted at any time the solenoid thereof is not energized electrically to apply air pressure to said air cylinder to retract said carriage, a first switch of the plurality connected electrically with said solenoid operated valve adapted, upon being actuated, to condition the solenoid operated valve to move the carriage inwardly toward the work centers, a second switch, a second air cylinder, a second solenoid operated valve adapted to direct air under pressure to said second air cylinder to move one of the work centers away from workpiece engaging position, said second solenoid operated valve adapted at any time the solenoid thereof is not energized to direct air under pressure to said second air cylinder to move said work center into workpiece engaging position, said second switch engageable by said switch actuating means at the point in the inward movement of the carriage when the carriage is in position to prevent said pick up means to the work centers for opening said work centers, a third switch associated with the work centers and adapted to be closed upon movement of the work center away from the workpiece engaging position, the third switch being connected electrically to the first mentioned solenoid operated valve whereby continued inward movement of the carriage as by current passing through the third switch only, and the second mentioned switch adapted to open at the innermost end of the travel of the carriage thereby permitting the work centers to close upon a workpiece on the cradles and permitting said carriage to retract.

4. Loading and unloading mechanism for a gear shaving machine of the type having work centers adapted to close toward one another upon a gear to be operated upon, said mechanism comprising a carriage mounted for horizontal reciprocating movement in a line which is at right angles to the axis of said work centers, a rack at one side of said work centers upon which workpieces may be stored, a pair of cradles on said carriage adapted to receive the opposite ends of a workpiece from the rack and carry said workpiece between them to the work centers, said cradles being tiltable, whereby upon engagement of the work centers with a workpiece upon the cradles, the cradles may tilt to permit the carriage to retract, means normally biasing said cradles into non-tilted positions, tiltable pick up means at the end of said carriage adjacent to the work centers, means at the side of the work centers opposite the rack engageable with the pick up means to tilt said pick up means to discharge a workpiece therefrom, and the cradles and pick up means being disposed longitudinally of the carriage a distance equal to the distance between the work centers and the means to tilt the pick up means for discharging a workpiece, whereby an unfinished workpiece upon the cradles is presented to the work centers at the same time a workpiece is being discharged from said pick up means.

5. Loading and unloading mechanism for a gear shaving machine of the type having work centers adapted to close toward one another upon a gear to be operated upon, said mechanism comprising a carriage mounted for horizontal reciprocating movement in a line which is at right angles to the axis of said work centers, a rack at one side of said work centers upon which workpieces may be stored, a pair of cradles on said carriage adapted to receive the opposite ends of a workpiece from the rack and carry said workpiece between them to the work centers, tiltable pick up means at the end of said carriage adjacent to said work centers, said pick up means movable between two stable positions, the first of said positions constituting a tilted position in which a workpiece on the pick up means falls therefrom, and the second stable position being one in which the pick up means cradles a workpiece, the pick up means being in the first stable position as the carriage moves in toward a finished workpiece such that engagement of the pick up means with the workpiece shifts the pick up means into the second stable position, means at the side of the work centers opposite the rack engageable with the pick up means to tilt said pick up means into the second stable position for discharging a workpiece thereon, and said pick up means movable into a third, unstable position during retracting movement of the carriage to clear a workpiece held in the work centers, and the cradles and pick up means being disposed longitudinally of the carriage a distance equal to the distance between the work centers and the means to tilt the pick up means for discharging a workpiece, whereby an unfinished workpiece upon the cradles is presented to the work centers at the same time a workpiece is being discharged from said pick up means.

6. Loading and unloading mechanism for a gear shaving machine of the type having work centers adapted to close toward one another upon a gear to be operated upon, said mechanism comprising a carriage mounted for horizontal reciprocating movement in a line which is at right angles to the axis of said work centers, a rack at one side of said work centers upon which workpieces may be stored, a pair of cradles on said carriage adapted to receive the opposite ends of a workpiece from the rack and carry said workpiece between them to the work centers, said cradles being tiltable, whereby upon engagement of the work centers with a workpiece upon the cradles, the cradles may tilt to permit the carriage to retract, means normally biasing said cradles into non-tilted positions, tiltable pick up means at the end of said carriage adjacent to said work centers, said pick up means movable between two stable positions, the first of said stable positions constituting a tilted position in which a workpiece on the pick up means falls therefrom, and the second stable position being one in which the pick up means cradles a workpiece, the pick up means being in the first stable position as the carriage moves in toward a finished workpiece such that engagement of the pick up means with the workpiece shifts the pick up means into the second stable position, means at the side of the work centers opposite the rack engageable with the pick up means to tilt said pick up means into the second stable position for discharging a workpiece thereon, and said pick up means movable into a third, unstable position during retracting movement of the carriage to clear a workpiece held in the work centers, and the cradles and pick up means being disposed longitudinally of the carriage a distance equal to the distance between the work centers and the means to tilt the pick up means for discharging a workpiece, whereby an unfinished workpiece upon the cradles is presented to the work centers at the same time a workpiece is being discharged from said pick up means.

References Cited in the file of this patent

UNITED STATES PATENTS

| | | |
|---|---|---|
| 379,307 | Codling | Mar. 13, 1888 |
| 937,259 | Neureuther | Oct. 19, 1909 |
| 1,933,226 | Smith et al. | Oct. 31, 1933 |
| 2,411,110 | Pruitt | Nov. 12, 1946 |
| 2,692,535 | Praeg | Oct. 26, 1954 |
| 2,778,279 | Moncrieff | Jan. 22, 1957 |